United States Patent [19]

Evard et al.

[11] Patent Number: 5,207,136
[45] Date of Patent: May 4, 1993

[54] MACHINING UNIT WITH ROTARY HEAD CARRYING PIVOTING TOOLS

[75] Inventors: Daniel Evard, Montmollin; Pierre-louis Piguet, La Chaux-de-Fonds; Hubert Rossetti, Les Geneveys-sur-Coffrane, all of Switzerland

[73] Assignee: Esco S.A., Switzerland

[21] Appl. No.: 776,286

[22] PCT Filed: Mar. 21, 1991

[86] PCT No.: PCT/CH91/00070

§ 371 Date: Nov. 20, 1991

§ 102(e) Date: Nov. 20, 1991

[87] PCT Pub. No.: WO91/14527

PCT Pub. Date: Oct. 3, 1991

[30] Foreign Application Priority Data

Mar. 26, 1990 [FR] France .................... 90 03993

[51] Int. Cl.$^5$ .................... B23B 5/12
[52] U.S. Cl. .................... 82/130; 82/73
[58] Field of Search .......... 82/130, 59, 67, 70, 82/72, 73, 98, 128, 147

[56] References Cited

U.S. PATENT DOCUMENTS

| 1,646,758 | 10/1927 | Matthews | 82/130 X |
| 3,528,327 | 9/1970 | Lindemann | 82/130 |
| 3,817,130 | 6/1974 | Goeke | 82/130 |
| 3,866,495 | 2/1975 | Goeke | 82/130 |

FOREIGN PATENT DOCUMENTS

| 0012154 | 6/1980 | European Pat. Off. | 82/130 |
| 0007311 | 7/1956 | Fed. Rep. of Germany | 82/130 |
| 1104289 | 4/1961 | Fed. Rep. of Germany . | |
| 0358727 | 10/1931 | United Kingdom | 82/130 |

Primary Examiner—Z. R. Bilinsky
Attorney, Agent, or Firm—Davis, Bujold & Streck

[57] ABSTRACT

A machining unit, in particular in a numerically controlled lathe, has a rotary head equipped with four pivoting tools for machining parts which pass axially through this head without rotating. Each tool is mounted on a respective pivoting support (6a-6d) provided with a helicoidal guiding surface (26a-26d) the axis of which coincides with the pivoting axis (7a-7d) of the support. The four tools are controlled by means of two concentric annular sockets (30, 42) controlled in translation. The inner socket (30) has two outer surfaces which rest against the guiding surfaces (26a, 26b) of two of the supports. The guiding surfaces are helixes of opposite pitch, and therefore one of the corresponding tools moves toward the part as the second tool moves away from it. The outer socket (42) controls the other two tools in the same manner.

8 Claims, 4 Drawing Sheets

MACHINING UNIT WITH ROTARY HEAD CARRYING PIVOTING TOOLS

The present invention concerns a rotary head machining unit holding at least two pivoting tools for machining a non-rotating part centered on the axis of rotation of the head, comprising:

a frame to which are attached a rotor comprising the rotary head and a spindle integral with it, the rotor having an axial conduit and being connected with rotary drive means;

axial means for guiding said part, said means being attached with bearings to the spindle or the rotary head;

means for maintaining and axially displacing the part;

at least two tool supports attached to the rotary head so as to pivot around respective axles parallel to the axis of rotation, each support having a transversely disposed control lever;

and means for controlling pivoting which cooperate with said levers and comprise at least one rotary control element which is movable in axial translation within the rotor and is attached to a translation device, and pairs of contact means disposed on each control lever, respectively, and on the corresponding rotary control element, each pair of contact means comprising a guiding surface and a support surface in contact with the guiding surface in a position which varies as a function of translation of the rotary control element.

Rotary heads for pivoting tools have long been used for screw cutting. They are able to machine metal parts in the form of a long wire traversing the rotor axially. Units of this type presently on the market generally have two or three tools, certain ones being independently controlled. To avoid problems of centrifugal acceleration resulting from head rotation, the tool supports pivot around respective axles which are eccentric in relation to the axis of rotation.

In such a unit the means for controlling pivoting of the tool supports play an essential role in machine performance with respect to precision and work speed. In one known system, pivoting of the tool holder is controlled by a rotary element with a conical surface upon which the control lever of the corresponding support rests. This element is integral with a sliding ring displaced by means of a translation mechanism. The lever is held in place on the conical surface by the effects of centrifugal acceleration acting on a counterweight, so that there is no play in the transmission.

This control system has certain disadvantages. Since the axis of the conical surface is relatively far from the pivoting axis of the corresponding tool support, the relationship of transmission between axial movement of the conical surface and radial tool displacement is linear for only the very smallest displacements. This precludes any usefulness for finishing fairly large diameter parts without a compensating device. Imprecise finishing results, even if numerical control is used. Furthermore, to control several tools independently, several concentric slidable sockets are needed, each having a cone-shaped portion activating the corresponding lever. This leads to very complex mechanics requiring great precision. In addition, the conical surfaces must be located on open segments spread out along the rotor periphery, thereby making the unit very susceptible to centrifugal force. This mechanical complexity, the resulting cumbersomeness and the effect of centrifugal force prevent very high rotation speeds, and thus high work speed.

Finally, it is practically impossible to increase the number of tools beyond three without increasing the complexity and dimensions of the rotor, which would result in further reductions in performance.

European Patent Application No. 12 154 describes a rotary head holding a pair of opposing tools, each having a pivoting support backed by a spring and held by a radially adjustable slide block. The position of the slide blocks is controlled by axial displacement of a cover with a conical interior surface upon which the slide blocks rest. This control mechanism, located relatively far from the axis of rotation, is large and heavy, and does not allow for separate control of each tool. U.S. Pat. Nos. 3,866,495 and 3,817,130 show other examples of rotary heads with a slidable peripheral cone controlling the radial position of several symmetrically arranged tools. German Patent Application No. 1 104 289 describes a lighter mechanism comprising several control rings separately pivotable and with spiral shaped support surfaces, but this concerns a stationary device for guiding the material and not the tools. This mechanism does not rotate and thus has no problems due to centrifugal force.

The aim of the present invention is to overcome the disadvantages described above by providing a rotary head equipped with very precise pivot control means and allowing simple, compact construction enabling rotation at elevated speeds.

To achieve this, the invention concerns a machining unit of the type specified above, characterized in that each guiding surface corresponding to a pivoting tool support has the shape of a partial helix, the axis of which coincides with the pivoting axis of said support.

Preferably, said contact surface is a cylindrical surface with generatrices perpendicular to the pivoting axis.

In a preferred embodiment, said guiding surface is located on the tool support and the corresponding contact surface is located on the rotary control element.

According to a particularly advantageous feature of the invention, the levers of the two tool supports cooperate with the same rotary control element so that, during translation of said element, a tool attached to one of these supports moves toward the axis of rotation, while a tool attached to the other support moves away from the axis, their respective helicoidal guiding surfaces each being pitched in the opposite direction.

A preferred form of the machining unit comprises two rotary control elements, independently movable in translation and each being annular in shape, these elements being respectively formed of an interior socket surrounding the spindle and with at least one contact surface on its exterior surface, and by an exterior socket surrounding the interior socket and with at least one contact surface on its interior surface.

Thus, the rotary head may be equipped with four tool supports, pivoting of two of these being controlled by the interior socket connected to a first translation device, and pivoting of the two others being controlled by the exterior socket connected to a second translation device. Preferably, the four guiding surfaces for the tool supports are located in essentially the same longitudinal position along the spindle. In addition, the four tool supports may comprise respective tool holders which are located generally in the same transverse plane.

In a particular embodiment of the machining unit, each translation device comprises a non-rotating ring connected to the rotary control element by means of bearings, and a linear actuator connected to said ring by means of a mechanism with a pivoting fork. Preferably, said non-rotating ring cooperates with a linear displacement sensor connected to a numerical control device acting upon said actuator.

The present invention and its advantages will be more clearly understood in the following description of one exemplary embodiment which is meant to be non-limiting and illustrated in the attached drawings, wherein.

Figure 1:
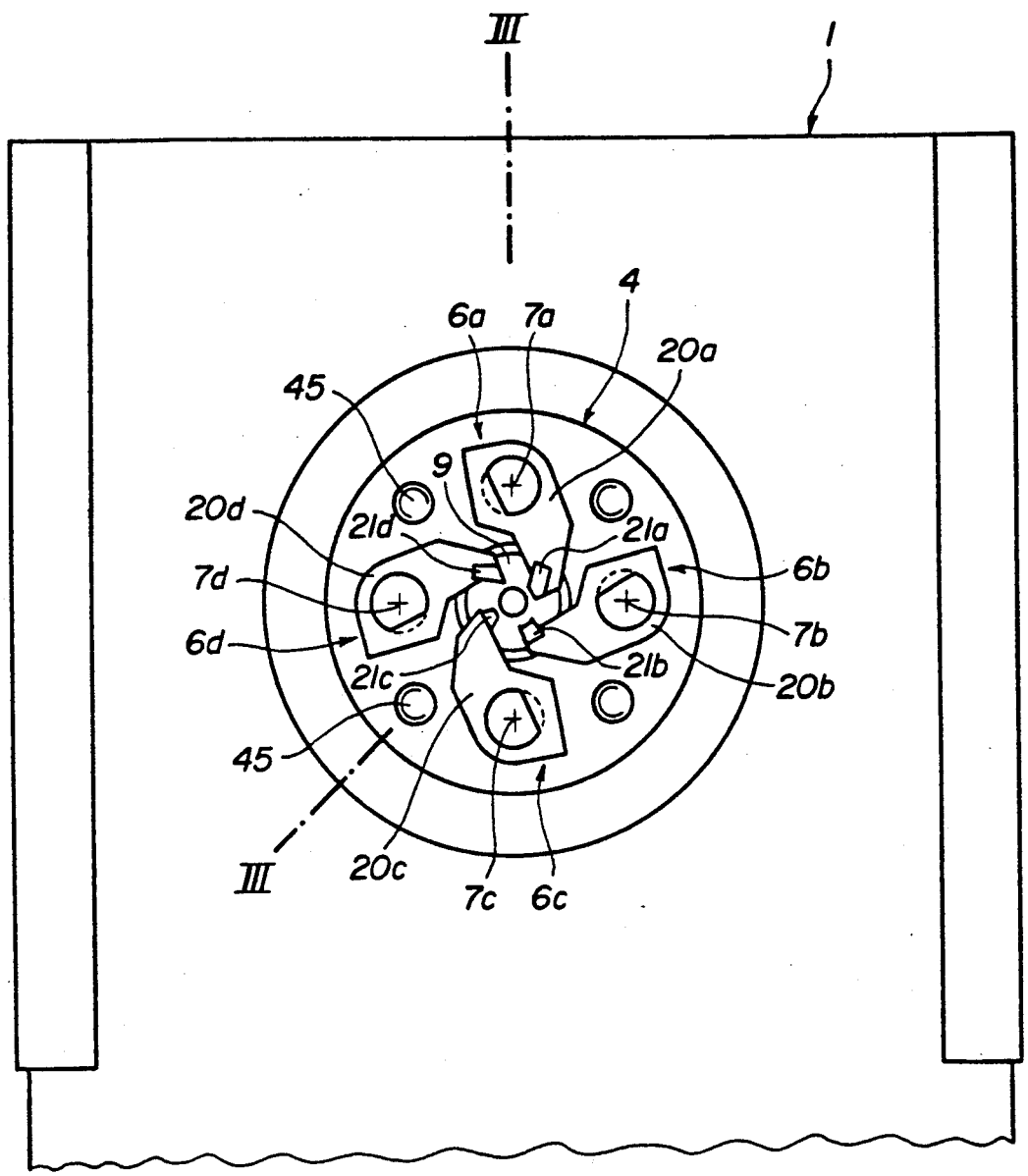
FIG. 1 is a frontal elevation of a machining unit according to the invention showing its rotary head with four pivoting tools.
Figure 2:
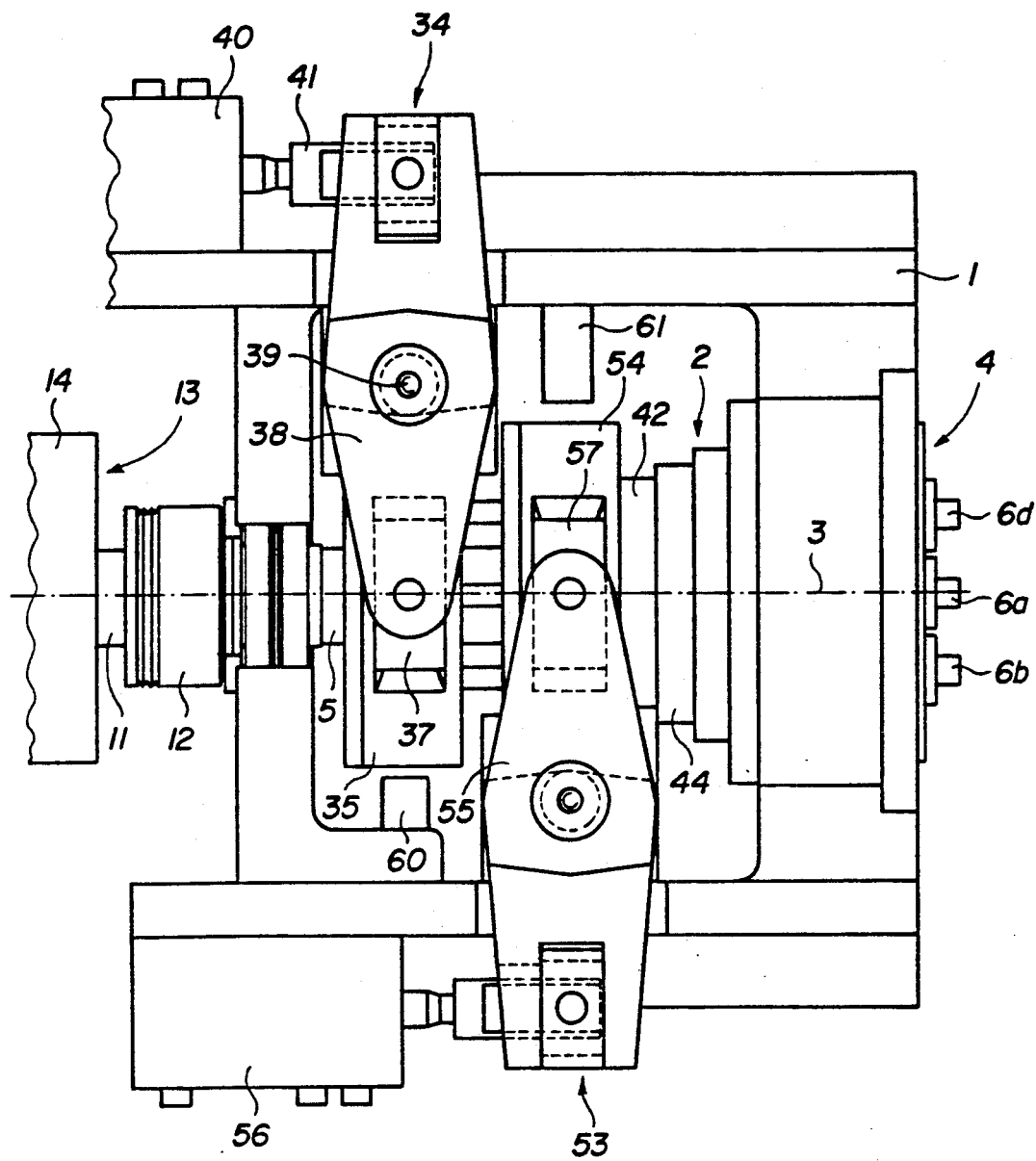
FIG. 2 is a plan view of the machining unit of FIG. 1.
Figure 3:
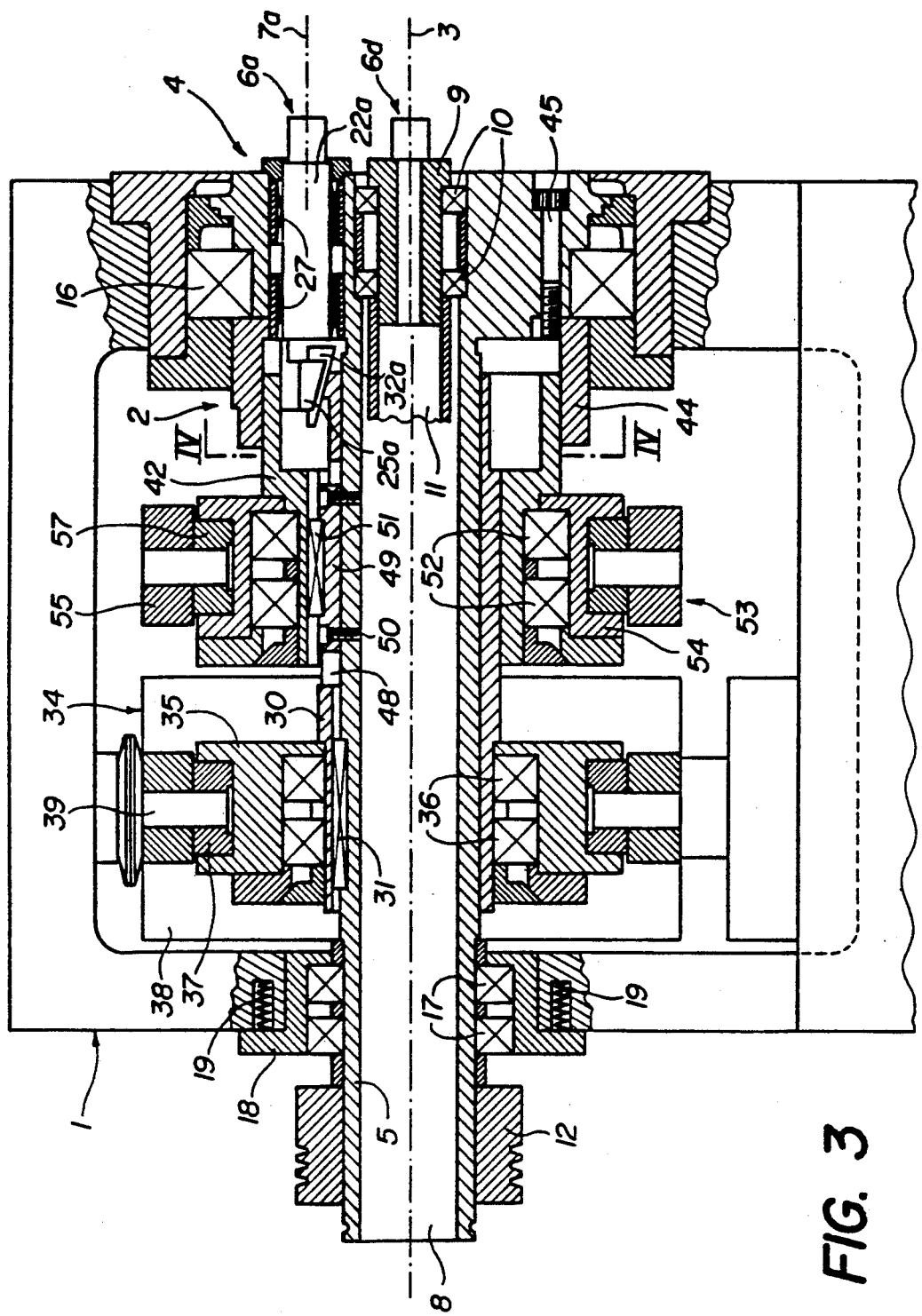
FIG. 3 is an axial cross-section taken along line III—III of FIG. 1 in the machining head and following a vertical plane for the rest of the unit.
Figure 4:
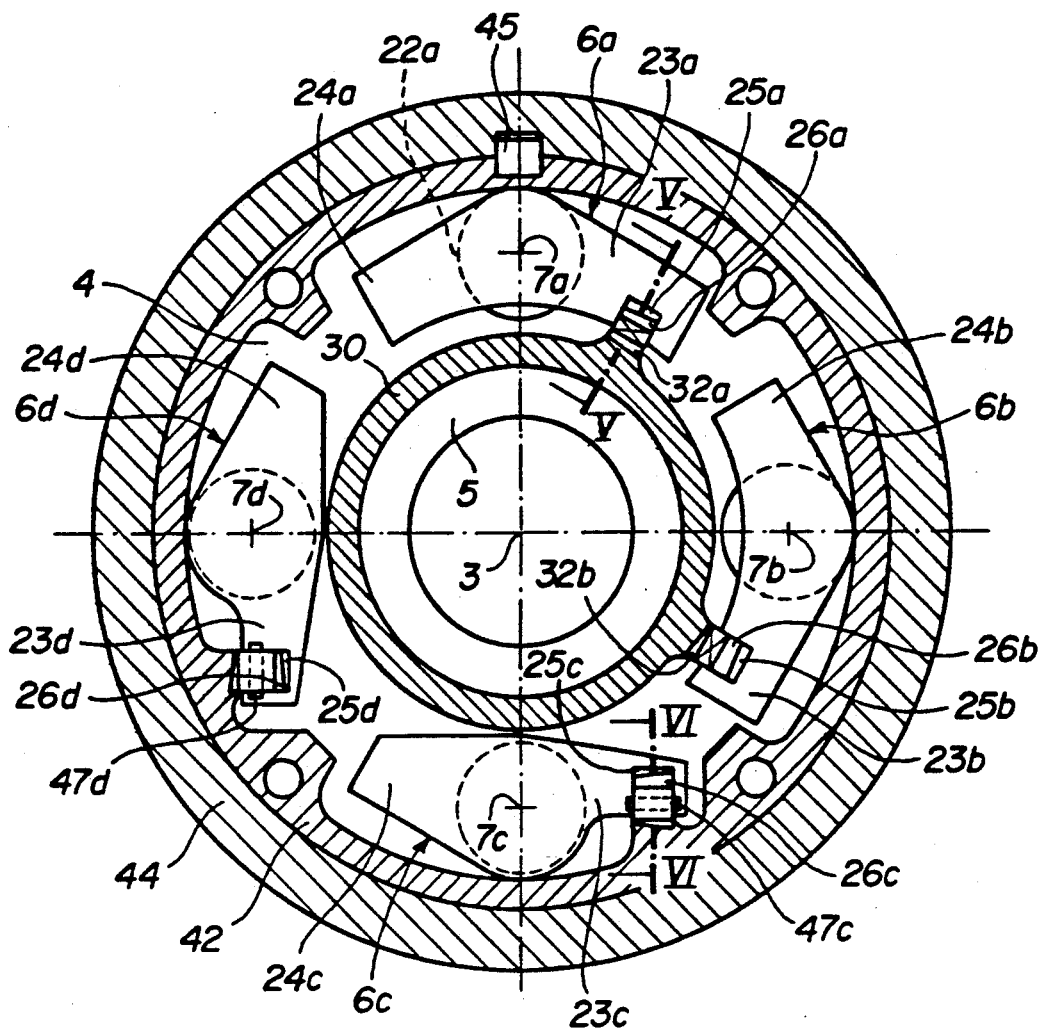
FIG. 4 is an enlarged transverse cross-section taken along line IV—IV of FIG. 3 showing a portion of the mechanism for controlling tool pivoting.

With reference to FIGS. 1 through 3, the machining unit comprises a frame 1 in which a rotor 2 is attached turning around an axle 3 and comprising a machining head 4, a hollow spindle 5 integral with said head, four tool supports 6a–6d pivoting on respective pivoting axes 7a–7d parallel to axle 3, as well as means for controlling pivoting of supports 6a–6d. Spindle 5 is provided with an axial conduit 8 through which the material to be finished passes in bar or wire form. In the area of the machining head 4, this material is guided by a non-rotating guide cylinder 9 attached to preloaded oblique contact bearings 10 and during rotation, integral with a tube 11 preventing it from turning. At its end opposite head 4, spindle 5 has a drive wheel 12. Tube 11 is prevented from rotation in a complementary module 13 containing a device with gripping means 14 for maintaining and advancing the material during machining and after completing a piece. Just as in the machining unit, this device is preferably controlled numerically with control elements not shown.

Machining head 4 forms an approximately cylindrical block supported in the frame by an oblique contact bearing 16 in the front and by two oblique contact bearings 17 in the rear. The latter are attached in parallel in a slidable socket 18 axially preloaded by springs 19 resting on frame 1. Thus, preloading of bearings 16 and 17 disposed in opposition is maintained constant no matter what the size variations of the elements may be, in particular of spindle 5. The generalized use of precision oblique contact bearings results a low level of vibration accompanied by elevated rotation speeds.

In FIG. 1 it can be seen that each tool support 6a through 6d has a removable tool support arm 20a–20d. When one of the supports 6a–6d pivots around its respective axis 7a–7d, the trajectory of four chisels 21a–21d may extend at least as far as axis of rotation 3, thereby allowing a part of any diameter to be machine finished and cut after machining. In known manner, the part being machine finished may be held by an axial gripping means (not shown) outside the machining unit. The tool holders 20a–d are advantageously located in the same transverse plane. To clarify the drawing, they are not shown in FIGS. 2 and 3.

FIGS. 1 through 6 show that each one of the tool supports 6a–6d comprises a cylindrical central portion 22a–22d attached to needle bearings 27 and, on the back of head 4 (FIG. 4) it is enlarged in the form of a control lever 23a–23d and a counterweight 24a–24d. The free end of the control lever 23a–23d laterally supports a hard metal plate 25a–25d with a helicoidal guiding surface 26a–d. Actually, each of these surfaces is a portion of a helical surface, the axis of which is precisely the axis of rotation 7a–7d of the corresponding tool support. However, the helices of the two guiding surfaces 26a and 26b are respectively pitched in opposite directions. The same is true for the two guiding surfaces 26c and 26d.

Pivoting of tool supports 6a and 6b is controlled by the sliding of a rotatable interior socket 30 surrounding spindle 5 and turning with it, said socket 30 being guided as it slides axially by a key 31. It is provided with two projections 32a and 32b (FIG. 4) with respective contact surfaces such as 33a, which are applied to guiding surfaces 26a and 26b along which they slide when interior socket 30 is axially displaced. These contact surfaces are partial cylinders, the generatrices of which are perpendicular to respective axes 7a, 7b, that is, rather than being in point-to-point contact, they are in linear contact along a common generatrix of the cylindrical contact surface and the helicoidal guiding surface. The result of this is decreased contact pressure and wear, and over the long term, increased precision in controlling pivoting.

Axial sliding of the interior socket 30 is controlled by means of a translation device 34 (FIGS. 2 and 3) with a non-rotating ring 35 attached to socket 30 by means of two bearings 36 with no play. This ring has two opposing notches in which two blocks 37 slide, the latter being pivotably held by a fork shaped lever 38 which is attached to frame 1 so that it pivots around a vertical axis 39 defined by bearings devoid of play under the influence of a linear actuator 40 to which the arm is connected by a connecting rod 41. Actuator 40 is parallel to axle 3 and may be hydraulic, electro-mechanical or otherwise. In this translation device 34, adjusting the elements and using precision bearings allow it to function with practically no play. The sliding of blocks 37 eliminates any non-axial load on spindle 5. Furthermore, in numerically controlled applications, the system for measuring displacement of socket 30 and thus of tool pivoting may be directly attached to non-rotating ring 35, thereby eliminating any imprecision in measurement which could intervene in translation device 34.

Figure 5:
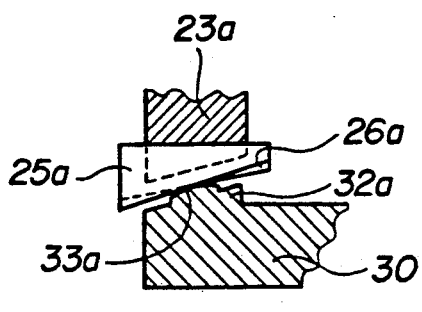
FIG. 5 is a detailed axial cross-section taken along line V—V of FIG. 4.
Figure 6:
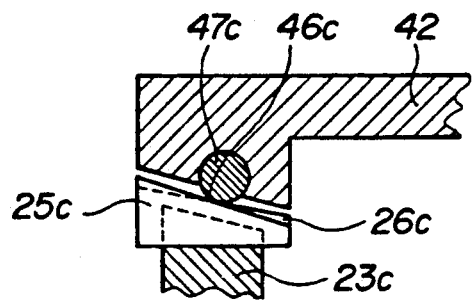
FIG. 6 is a detailed axial cross-section taken along line VI—VI of FIG. 4.

When actuator 40 is controlled so that it makes interior socket 30 move forward toward head 4, contact surface 33a slides on guiding surface 26a to the left in the case of FIG. 5 and pushes lever 23a toward the outside, which makes tool support 6a pivot so that chisel 21a moves closer to axle 3 and attacks the piece to be machine finished. At the same time, tool support 6b pivots in the opposite direction, since its helicoidal guiding surface pitches in the opposite direction, so that chisel 21b moves away from the piece to be finished.

The two other pivoting tool supports 6c and 6d are similarly controlled, but by being supported toward the outside by an exterior rotating socket 42 surrounding interior socket 30 and slidably attached in a tubular piece 44 of rotor 2. This piece 44 is affixed by means of bolt 45 and thus serves to block bearing 16 on rotary head 4. Near its front extremity exterior socket 42 rests on guiding surfaces 26c and 26d with contact surfaces such as 46c, in this example made of small cylindrical bars 47c, 47d of hard metal, inserted in and attached to housings on the inside surface of socket 42. These bars have generatrices perpendicular to axes 7c, 7d of helicoidal guiding surfaces 26c, 26d and they are in linear contact with them.

Interior socket 30 comprises, in the median portion of its length, three openings 48 disposed at 120° from each other in which there are three guide studs 49 attached with bolts 50 to spindle 5. These studs support the rear portion of exterior socket 42 and guide it axially by means of keys 51 engaging grooves in socket 42. Sliding of socket 42 is controlled by a translation device 53 similar to device 34 and like it, comprising a non-rotating ring 54 held by a pair of bearings 52, sliding blocks 57, a fork shaped lever 55 and a linear actuator 56 controlled independently of actuator 40. Here also, maneuvering actuator 56 makes one of the tool supports 6c, 6d pivot in one direction and the other in the opposite direction.

When each of the translation devices 34 and 53 is in the median position, none of the four tools 6a through 6d is in contact with the part to be machine finished. In this position, any one of the other tools may be placed on the part if corresponding actuator 40, 56 is made to function in the appropriate direction. Since each of the interior sockets 30 and exterior sockets 42 controls two adjacent tools, it is possible to simultaneously but independently activate two chisels in opposing positions in relation to the part, for example, chisels 21a and 21c.

In contrast to prior art machining heads which control tool pivoting by means of individual segments with conical surfaces, the machining unit according to the invention has a much more simple and compact construction, even though it may include up to four different tools, as opposed to the three tools of present machines. Use of a rotor of reduced dimension and the fact that the two rotatable sockets 30 and 42 absorbing the forces resulting from centrifugal acceleration are annular in shape results in an especially rigid rotor with a low level of vibration, thereby allowing rotation speed to be increased to, for example, approximately 12,000 rotations per minute for an interior diameter of 80 mm on bearing 16 of the machining head, as opposed to a speed of about 8,000 rotations per minute in present machines. Controlling four tools by means of only two actuators also represents an important simplification in construction and function. Lastly, because there are separate helicoidal guiding surfaces for each tool, linear movement of the tools in relation to that of the control mechanism improves machining precision considerably and opens up new applications for rotary head lathes. In the case where numerical control is used, this allows one to measure radial displacement of the rotating tools with linear displacement sensors 60 and 61 attached to frame 1 and cooperating with non-rotating rings 35 and 54.

The present invention is not limited to the exemplary embodiment described above, but may extend to any modification or variation obvious to one skilled in the art. In particular, following the same principles, one might conceive of a simpler machining head with only one pair of tools and only one translation device controlling those two tools.

We claim:

1. Rotary head machining unit holding at least two pivoting tools for machining a non-rotating part centered on the axis of rotation of the head, comprising:
   a frame to which is rotatably mounted a rotor comprising the rotary head and a spindle integral with the rotary head, the rotor having an axial conduit and being connected to rotary drive means;
   axial means for guiding said part, said means being attached with bearings to the spindle or the rotary head;
   means for maintaining and axially displacing the part;
   at least two tool supports attached to the rotary head so as to pivot around respective axes parallel to the axis of rotation, each support having a transversely disposed control lever;
   and means for separately controlling pivoting which cooperate with said levers and comprise at least one annular rotary control element which is movable in axial translation within the rotor and is connected to a translation control device, and at least two sliding contact means each of which is associated with a respective one of said control levers and comprises a pair of surfaces located on the respective control lever and on the respective annular rotary control element, said pair of surfaces comprising a guiding surface and a contact surface resting on the guiding surface in a position which varies as a function of translation of the annular rotary control element, characterized in that each guiding surface (26a-26d) corresponding to a pivoting tool support (6a-6d) is shaped as a portion of a helix, the axis of which corresponds with the pivoting axis (7a-7d) of said support.

2. Machining unit according to claim 1, characterized in that said contact surface (33a, 46c) is a cylindrical surface with generatrices perpendicular to said pivoting axis (7a-7c).

3. Machining unit according to claim 1, characterized in that the levers (23a-23d) of the two tool supports (6a and 6b; 6c and 6d) cooperate with the same rotary control element (30, 42) so that during translation of said element, a tool attached to one of the supports moves close to the axis of rotation while a tool attached to the other support moves away from said axis, their respective helicoidal guiding surfaces (26a and 26b) each being pitched in the opposite direction.

4. Machining unit according to claim 3, characterized in that said guiding surface (26a-26d) is located on the tool support (6a-6d) and the corresponding contact surface is located on the rotary control element (30, 42); by comprising two rotary control elements (30, 42) independently movable in translation and each being annular in shape, these elements being respectively formed of an interior socket (30) surrounding the spindle (5) and provided with at least one contact surface (33a) on its outside surface, and of an exterior socket (42) surrounding the interior socket (30) and provided with at least one contact surface (46c) on its interior surface, and in that the rotary head (4) is equipped with four tool supports (6a-6d), the pivoting of two of these being controlled by the interior socket (30) connected to a first translation device (34), and pivoting of the two others is controlled by the exterior socket (42) connected to the second translation device (53).

5. Machining unit according to claim 4, characterized in that four of the guiding surfaces (26a-26d) of the tool supports are located in essentially the same longitudinal position along the spindle (5).

6. Machining unit according to claim 4, characterized in that the four tool supports (6a-6d) comprise respective tool holders (20a-20d) which are situated in essentially the same transverse plane.

7. Machining unit according to claim 1, characterized in that the translation device (34, 53) comprises a non-rotating ring (35, 54) connected to the rotary control element (30, 42) by means of bearings, and a linear actuator (40, 56) connected to said ring by means of a pivoting fork mechanism.

8. Machining unit according to claim 7, characterized in that said non-rotating ring (35, 54) cooperates with a linear displacement sensor (60, 61) connected to a numerical control device acting upon said actuator (40, 56).

* * * * *